(12) United States Patent
Sang et al.

(10) Patent No.: US 11,803,279 B2
(45) Date of Patent: Oct. 31, 2023

(54) TOUCH SUBSTRATE, TOUCH APPARATUS AND METHOD OF PREPARATION WITH DUMMY ELECTRODE CONNECTED TO ELECTROSTATIC TRANSMISSION LAYER

(71) Applicants: Hefei Xinsheng Optoelectronics Technology Co., Ltd., Hefei (CN); BOE Technology Group Co., Ltd., Beijing (CN)

(72) Inventors: Huayu Sang, Beijing (CN); Tianyu Zhang, Beijing (CN); Xue Zhao, Beijing (CN); Tengfei Zhong, Beijing (CN); Xinxiu Zhang, Beijing (CN); Wenjie Xu, Beijing (CN); Xiaodong Xie, Beijing (CN); Min He, Beijing (CN)

(73) Assignees: Hefei Xinsheng Optoelectronics Technology Co., Ltd., Hefei (CN); BOE Technology Group Co., Ltd., Beijing (CN)

(*) Notice: Subject to any disclaimer, the term of this patent is extended or adjusted under 35 U.S.C. 154(b) by 92 days.

(21) Appl. No.: 17/615,567

(22) PCT Filed: Feb. 26, 2021

(86) PCT No.: PCT/CN2021/078094
§ 371 (c)(1),
(2) Date: Nov. 30, 2021

(87) PCT Pub. No.: WO2022/178812
PCT Pub. Date: Sep. 1, 2022

(65) Prior Publication Data
US 2023/0168778 A1    Jun. 1, 2023

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05);
(Continued)

(58) Field of Classification Search
CPC ..... G06F 3/0445; G06F 3/0446; G06F 3/0412;
(Continued)

(56) References Cited

U.S. PATENT DOCUMENTS

2018/0252955 A1   9/2018   Kurasawa et al.
2019/0155417 A1*  5/2019   Lee et al. ............ G06F 3/0446
(Continued)

FOREIGN PATENT DOCUMENTS

CN     109061930 A    12/2018
CN     110308829 A    10/2019
(Continued)

*Primary Examiner* — Liliana Cerullo
(74) *Attorney, Agent, or Firm* — Ling Wu; Stephen Yang; Ling and Yang Intellectual Property

(57) ABSTRACT

Disclosed are a touch substrate and a preparation method thereof, and a touch apparatus. The touch substrate includes an electrostatic transmission layer, a first insulating layer, a first conductive layer, a second insulating layer, and a second conductive layer which are sequentially stacked, wherein the first conductive layer includes a first touch electrode, the second conductive layer includes a second touch electrode and a second dummy electrode which are insulated from each other, and the second dummy electrode is electrically connected to the electrostatic transmission layer by means of a via penetrating the first insulating layer and the second insulating layer; and/or, the first conductive layer further includes a plurality of first dummy electrodes insulated from one another, and the first dummy electrode and the first touch electrode are insulated from each other.

13 Claims, 10 Drawing Sheets

(52) U.S. Cl.
CPC .............. *G06F 2203/04103* (2013.01); *G06F 2203/04107* (2013.01); *G06F 2203/04112* (2013.01)

(58) Field of Classification Search
CPC ............ G06F 2203/04103; G06F 2203/04107; G06F 2203/04112
See application file for complete search history.

(56) References Cited

U.S. PATENT DOCUMENTS

| | | | |
|---|---|---|---|
| 2019/0302921 A1 | 10/2019 | Chen et al. | |
| 2020/0033996 A1* | 1/2020 | Zhong et al. | ....... G06F 3/04164 |
| 2021/0005960 A1* | 1/2021 | Kida et al. | ............... H01Q 7/00 |
| 2021/0048906 A1 | 2/2021 | Zhong et al. | |
| 2021/0349563 A1* | 11/2021 | Adachi | ............... G06F 3/04164 |

FOREIGN PATENT DOCUMENTS

| | | | |
|---|---|---|---|
| CN | 110456943 A | 11/2019 | |
| CN | 112394844 A | 2/2021 | |

\* cited by examiner

TOUCH SUBSTRATE, TOUCH APPARATUS AND METHOD OF PREPARATION WITH DUMMY ELECTRODE CONNECTED TO ELECTROSTATIC TRANSMISSION LAYER

CROSS-REFERENCE TO RELATED APPLICATION

The present application is a U.S. National Phase Entry of International Application No. PCT/CN2021/078094 having an international filing date of Feb. 26, 2021, the content of which is incorporated herein by reference in its entirety.

TECHNICAL FIELD

Embodiments of the present disclosure relate to, but are not limited to, the field of touch technologies, in particular to a touch substrate and a preparation method thereof, and a touch apparatus.

BACKGROUND

With the rapid development of display technologies, the touch technologies have been applied to various electronic devices and various fields, and are increasingly popular among users. According to working principles, touch screens may be classified into: capacitive touch screens, resistive touch screens, infrared touch screens, surface acoustic wave touch screens, electromagnetic touch screens, and the like. Based on a unique touch principle, the capacitive touch screens are widely used in various electronic interactive scene devices due to advantages such as high sensitivity, long service life, and high light transmittance.

There are many bonding processes during manufacturing a touch product, including bonding of a polarizer, bonding of a screen and a backlight module, bonding of cover glass, full bonding of a display screen and a touch screen, bonding of a protective film, etc. These bonding processes all involve a processing of tearing off the protective film before bonding, the film tearing process is very easy to generate a large amount of static electricity, and the electrostatic charges generated during the film tearing are difficult to dissipate in a short time. In addition, during using the touch product by users, electrostatic charge accumulation occurs due to the friction, leading to the problem of abnormal display of a liquid crystal display (LCD) caused by the impact of an external electric field.

SUMMARY

The following is a brief description of the subject matter detailed herein. The brief description is not intended to limit the scope of protection of the claims.

An exemplary embodiment of the present disclosure provides a touch substrate, including an electrostatic transmission layer, a first insulating layer, a first conductive layer, a second insulating layer, and a second conductive layer which are sequentially stacked, wherein: the first conductive layer includes a first touch electrode, the second conductive layer includes a second touch electrode and a second dummy electrode which are insulated from each other, and the second dummy electrode is electrically connected to the electrostatic transmission layer by means of a via penetrating the first insulating layer and the second insulating layer; and/or, the first conductive layer further includes a plurality of first dummy electrodes insulated from one another, and the first dummy electrode and the first touch electrode are insulated from each other.

In some exemplary embodiments, the first touch electrode includes a plurality of first sub-electrodes sequentially arranged at intervals along a first direction; and the second touch electrode includes a plurality of second touch sub-electrodes, the second dummy electrode includes a plurality of second dummy sub-electrodes, and at least one of the second touch sub-electrodes and at least one of the second dummy sub-electrodes are sequentially arranged in parallel at intervals along a second direction and are electrically isolated from each other.

In some exemplary embodiments, each of the first sub-electrode, the second dummy sub-electrode, and the second touch sub-electrode is a mesh structure, and the width of the second touch sub-electrode in the second direction is greater than the width of the second dummy sub-electrode in the second direction.

In some exemplary embodiments, each of the second dummy sub-electrodes includes a second dummy main electrode and a plurality of second dummy floating electrodes which are disconnected from one another, the plurality of second dummy floating electrodes are disposed between the second dummy main electrode and the second touch electrode, and the second dummy main electrode, the second dummy floating electrode, and the second touch electrode are insulated from one another.

In some exemplary embodiments, one or two columns of the second dummy floating electrodes sequentially arranged along the first direction are disposed between two adjacent second touch electrodes.

In some exemplary embodiments, a manufacturing material of the electrostatic transmission layer is an indium tin oxide membrane added with conductive particles, a resistance value of the indium tin oxide membrane is $10^7$ to $10^{13}$ ohms, and a manufacturing material of the conductive particles includes any one or more of gold, silver, and aluminum.

In some exemplary embodiments, the touch substrate further includes a base substrate, wherein the base substrate includes an array substrate and an opposite substrate which are disposed in a cell alignment manner, the base substrate includes a bonding area, the bonding area includes a ground wire, and the electrostatic transmission layer is connected to the ground wire of the bonding area.

An exemplary embodiment of the present disclosure further provides a touch apparatus, including a base substrate and a touch substrate disposed on the base substrate, wherein the base substrate includes an array substrate and an opposite substrate which are disposed in a cell alignment manner, and the touch substrate is the touch substrate according to any one of the above embodiments.

An exemplary embodiment of the present disclosure further provides a preparation method for a touch substrate, wherein the preparation method includes:
  forming an electrostatic transmission layer on a base substrate;
  forming a first insulating layer on one side of the electrostatic transmission layer away from the base substrate;
  forming a first conductive layer on one side of the first insulating layer away from the electrostatic transmission layer, wherein the first conductive layer includes a first touch electrode;
  forming a second insulating layer on one side of the first conductive layer away from the first insulating layer, and forming a plurality of vias in the second insulating layer, wherein the vias penetrate the second insulating layer and the first insulating layer; and forming a second conductive layer on one side of the second insulating layer away from the first conductive layer, wherein the second conductive layer includes a second touch electrode and a second dummy electrode which are insulated from each other, and the second dummy electrode is electrically connected to the electrostatic transmission layer by means of the vias.

In some exemplary embodiments, the first touch electrode includes a plurality of first sub-electrodes sequentially arranged at intervals along a first direction; and the second touch electrode includes a plurality of second touch sub-electrodes, the second dummy electrode includes a plurality of second dummy sub-electrodes, and at least one of the second touch sub-electrodes and at least one of the second dummy sub-electrodes are sequentially arranged in parallel at intervals along a second direction and are electrically isolated from each other.

In some exemplary embodiments, each of the first sub-electrode, the second dummy sub-electrode, and the second touch sub-electrode is a mesh structure, and the width of the second touch sub-electrode in the second direction is greater than the width of the second dummy sub-electrode in the second direction.

In some exemplary embodiments, each of the second dummy sub-electrodes includes a second dummy main electrode and a plurality of second dummy floating electrodes which are disconnected from one another, the plurality of second dummy floating electrodes are disposed between the second dummy main electrode and the second touch electrode, and the second dummy main electrode, the second dummy floating electrode, and the second touch electrode are insulated from one another.

In some exemplary embodiments, one or two columns of the second dummy floating electrodes sequentially arranged along the first direction are disposed between two adjacent second touch electrodes.

After reading and understanding of the accompanying drawings and detailed description, other aspects can be understood.

BRIEF DESCRIPTION OF DRAWINGS

The accompanying drawings are used to provide a further understanding of the technical solution of the present disclosure, constitute a part of the description, and are used to explain the technical solution of the present disclosure together with the embodiments of the present disclosure, without forming a limitation to the technical solution of the present disclosure. The shapes and dimensions of respective components in the accompanying drawings do not reflect the actual scale, and are only intended to illustrate content of the present disclosure.

DETAILED DESCRIPTION

Figure 1:
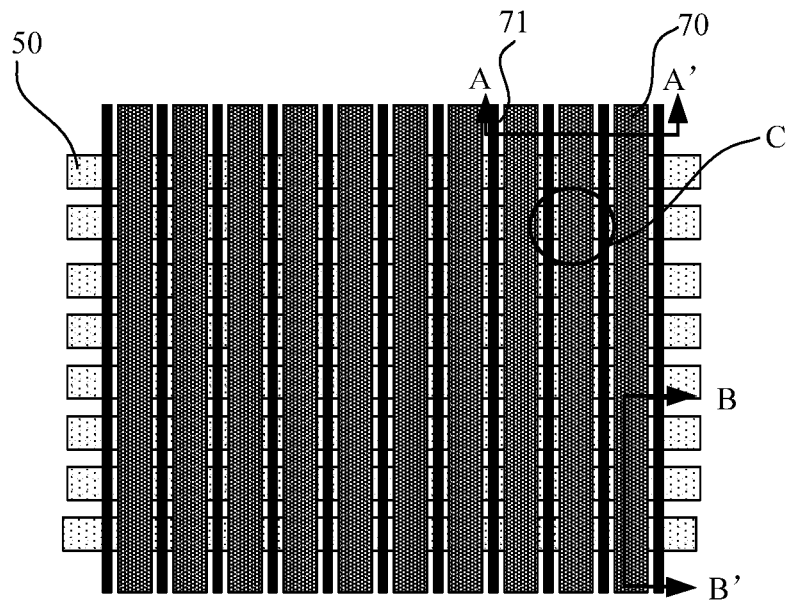
FIG. 1 is a schematic diagram of a structure of a touch substrate according to an embodiment of the present disclosure.

Hereinafter, the embodiments of the present disclosure will be described in detail in combination with the accompanying drawings. It is noted that the embodiments may be implemented in a number of different forms. Those of ordinary skills in the art can easily understand the fact that the embodiments and contents can be transformed into various forms without departing from the purpose and scope of the present disclosure. Therefore, the present disclosure should not be interpreted as being limited to the content described in the following embodiments. In the case of no conflict, the embodiments in the present disclosure and the features in the embodiments can be randomly combined with each other.

Unless otherwise defined, technical terms or scientific terms used in the embodiments of the present disclosure should have the ordinary meanings as understood by those of ordinary skills in the art to which the present disclosure belongs. The terms "first", "second", and the like used in the embodiments of the present disclosure do not denote any order, quantity, or importance, but are merely used to distinguish different components. The terms "include", "contain", or the like are intended to mean that the element or object in front of the term covers the element or object or equivalents listed behind the term, without excluding other elements or objects.

In the embodiments of the present disclosure, the transistor refers to an element at least including three terminals of a gate electrode, a drain electrode, and a source electrode. The transistor has a channel region between the drain electrode (drain electrode terminal, drain region, or drain electrode) and the source electrode (source electrode terminal, source region, or source electrode), and a current can flow through the drain electrode, the channel region, and the source electrode. It is noted that in the description, the channel region refers to a region through which the current mainly flows.

In the specification, a first electrode may be the drain electrode and a second electrode may be the source electrode, or the first electrode may be the source electrode and the second electrode may be the drain electrode. In a case of using transistors with opposite polarities or in a case where the direction of the current in circuit operation changes, functions of the "source electrode" and the "drain electrode" may be interchanged sometimes. Therefore, in the specification, the "source electrode" and the "drain electrode" may be interchanged.

In the specification, "connection" includes a case where constituent components are connected together by an element having a certain electrical function. The "element having a certain electrical function" is not particularly limited as long as it can send and receive an electrical signal between the connected constituent components. Examples of the "element having a certain electrical function" include not only electrodes and wirings, but also switching elements (such as transistors), resistors, inductors, capacitors, and other elements having various functions.

An embodiment of the present disclosure provides a touch substrate. The touch substrate includes an electrostatic transmission layer, a first insulating layer, a first conductive layer, a second insulating layer, and a second conductive layer which are sequentially stacked, wherein the first conductive layer includes a first touch electrode, the second conductive layer includes a second touch electrode and a second dummy electrode which are insulated from each other, and the second dummy electrode is electrically connected to the electrostatic transmission layer by means of a via penetrating the first insulating layer and the second insulating layer; and/or, the first conductive layer further includes a plurality of first dummy electrodes insulated from one another, and the first dummy electrode and the first touch electrode are insulated from each other.

In the touch substrate provided by the embodiment of the present disclosure, storage of electrostatic charges in the dummy electrode is effectively reduced by connecting the second dummy electrode to the electrostatic transmission layer, facilitating discharge of the electrostatic charges, and thereby solving a problem of abnormal display of a liquid crystal display panel caused by the static electricity and a problem in shadow elimination caused by the cut dummy electrode.

The technical solution of the present disclosure is described in detail below by means of specific embodiments.

Figure 2:
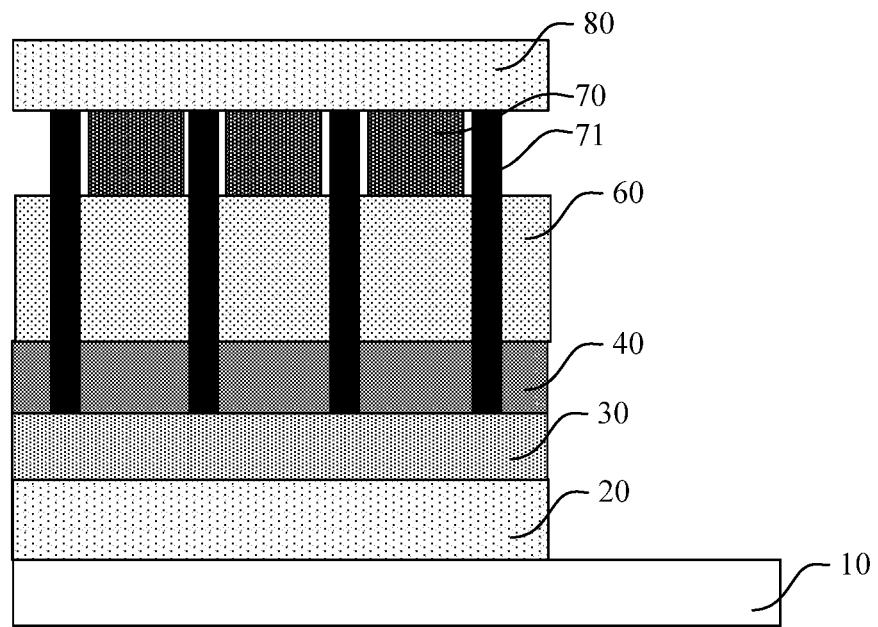
FIG. 2 is a schematic diagram of a sectional structure of an area AA' of the touch substrate in FIG. 1.
Figure 3:
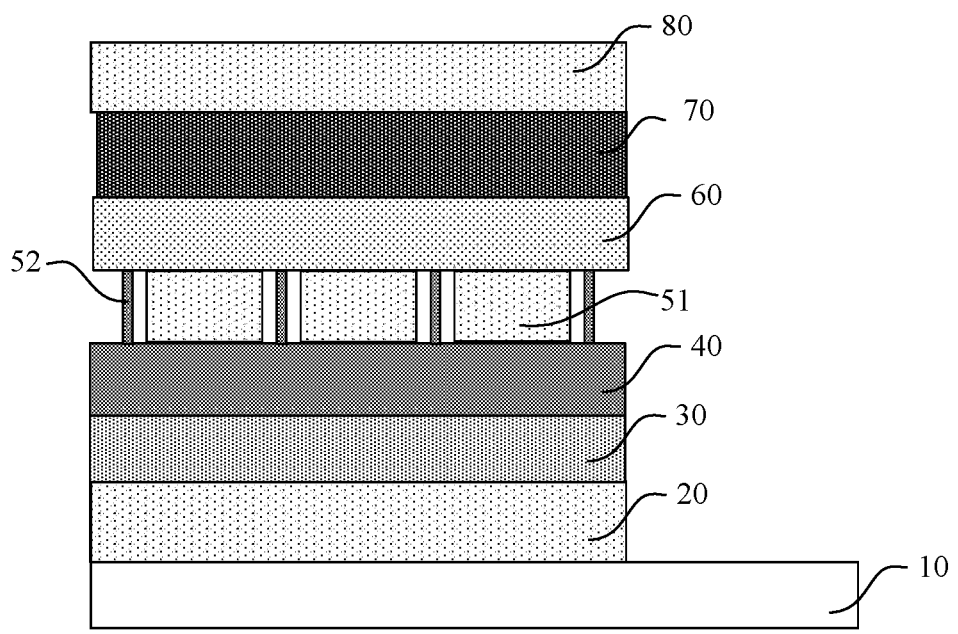
FIG. 3 is a schematic diagram of a sectional structure of an area BB' of the touch substrate in FIG. 1.

FIG. 1 is a schematic diagram of a structure of a touch substrate according to an embodiment of the disclosure, FIG. 2 is a schematic diagram of a sectional structure of an area AA' of the touch substrate in FIG. 1, and FIG. 3 is a schematic diagram of a sectional structure of an area BB' of the touch substrate in FIG. 1. Referring to FIG. 1, FIG. 2, and FIG. 3, the touch substrate of this embodiment includes a base substrate, and an electrostatic transmission layer 30, a first insulating layer 40, a first conductive layer 50, a second insulating layer 60, and a second conductive layer which are sequentially stacked on base substrate.

The first conductive layer 50 includes a first touch electrode 51, and the second conductive layer includes a second touch electrode 70 and a second dummy electrode 71 which are insulated from each other. The second dummy electrode 71 is electrically connected to the electrostatic transmission layer 30 by means of a via penetrating the first insulating layer 40 and the second insulating layer 60.

Figure 8:
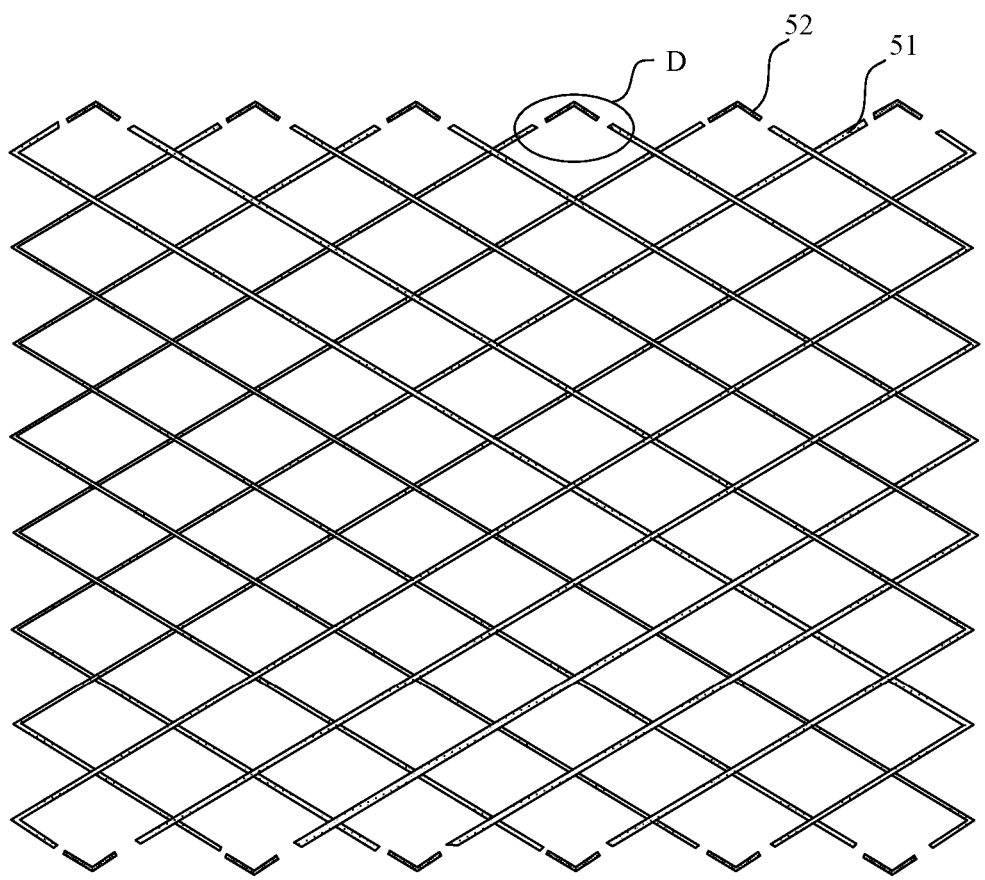
FIG. 8 is a schematic diagram of a structure of the first conductive layer.

In some exemplary embodiments, referring to FIG. 8, the first conductive layer 50 may further include a plurality of first dummy electrodes 52 insulated from one another, and the first dummy electrodes 52 and the first touch electrode 51 are insulated from each other.

Figure 9:
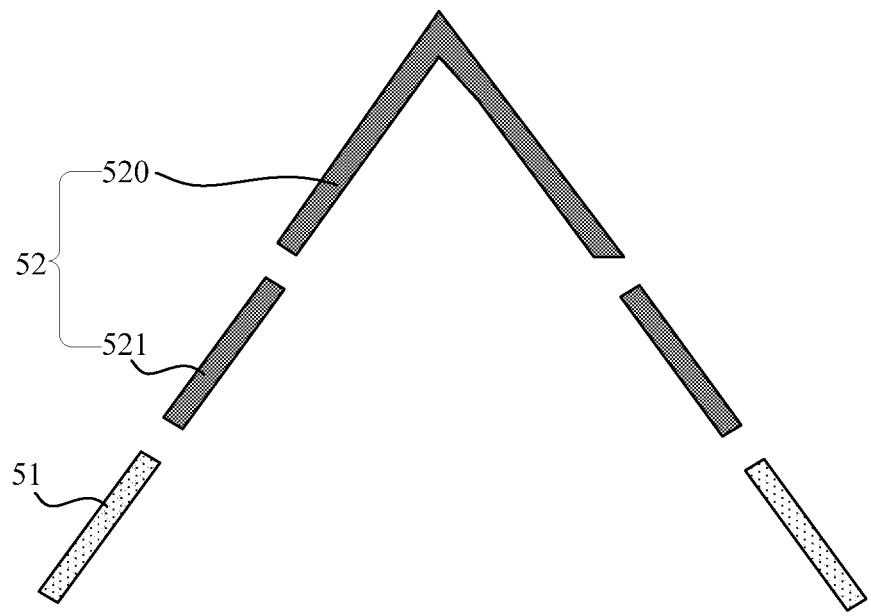
FIG. 9 is an enlarged schematic diagram of a structure of an area D in FIG. 8.

In some exemplary embodiments, referring to FIG. 9, the first dummy electrode 52 may include a first dummy main electrode 520 and a first dummy floating electrode 521, and the first dummy floating electrode 521 is disposed between the first dummy main electrode 520 and the first touch electrode 51. The first dummy main electrode 520, the first dummy floating electrode 521, and the first touch electrode 51 are insulated from one another.

In some exemplary embodiments, referring to FIG. 1, the first touch electrode 51 may include a plurality of first sub-electrodes sequentially arranged at intervals along a first direction.

The second touch electrode 70 may include a plurality of second touch sub-electrodes, the second dummy electrode 71 may include a plurality of second dummy sub-electrodes, and at least one second touch sub-electrode and at least one second dummy sub-electrode are sequentially arranged in parallel at intervals along a second direction and are electrically isolated from each other.

Figure 4:
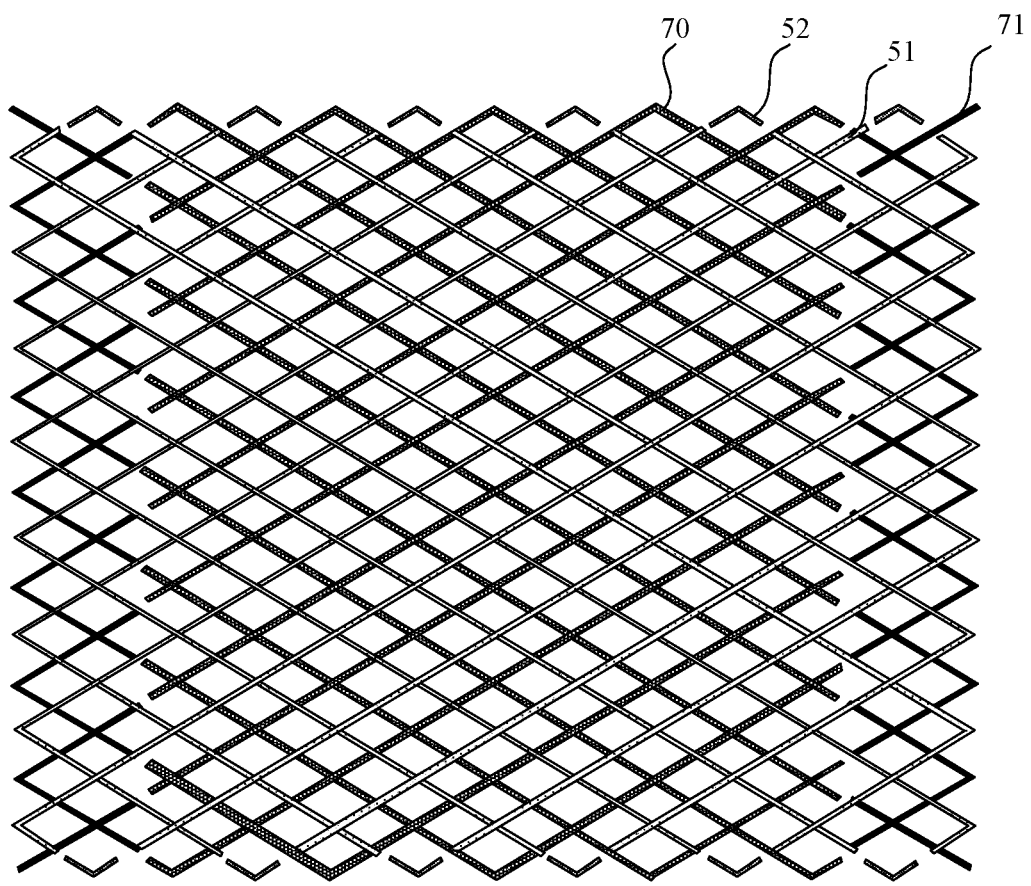
FIG. 4 is an enlarged schematic diagram of a structure of an area C of the touch substrate in FIG. 1.

In some exemplary embodiments, referring to FIG. 4, each of the first sub-electrode, the second dummy sub-electrode, and the second touch sub-electrode may be a mesh structure, and a width of the second touch sub-electrode in the second direction is greater than a width of the second dummy sub-electrode in the second direction.

Figure 12:
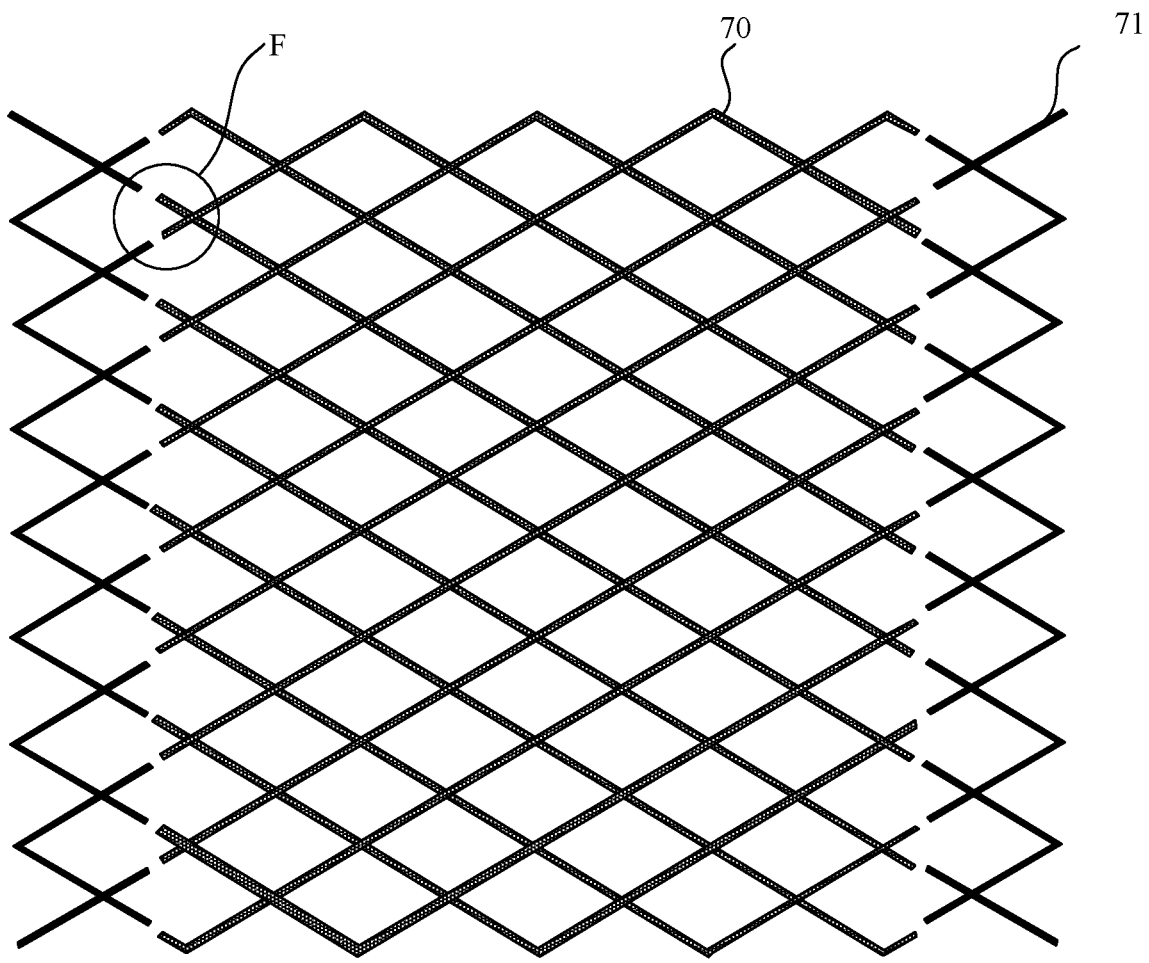
FIG. 12 is a schematic diagram of a planar structure of an area E in FIG. 11.
Figure 13:
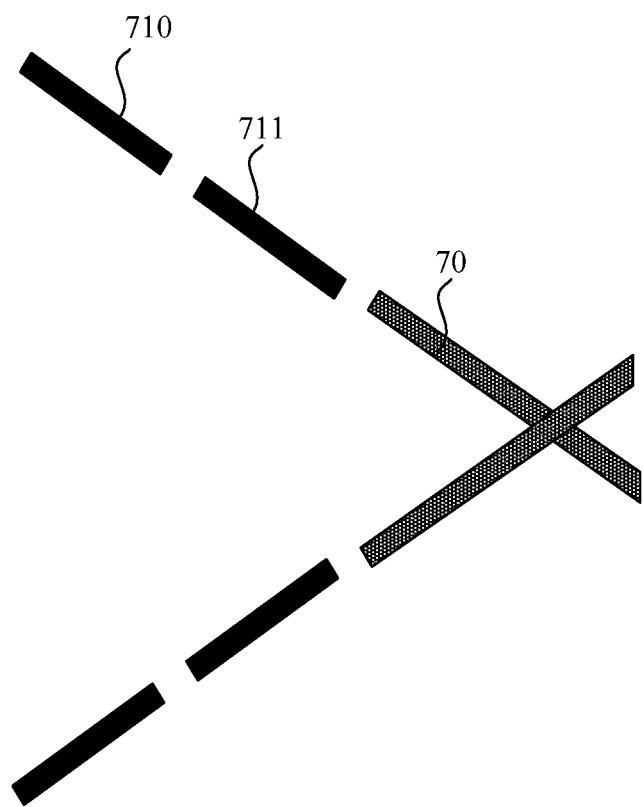
FIG. 13 is an enlarged schematic diagram of a structure of an area F in FIG. 12.
Figure 14:
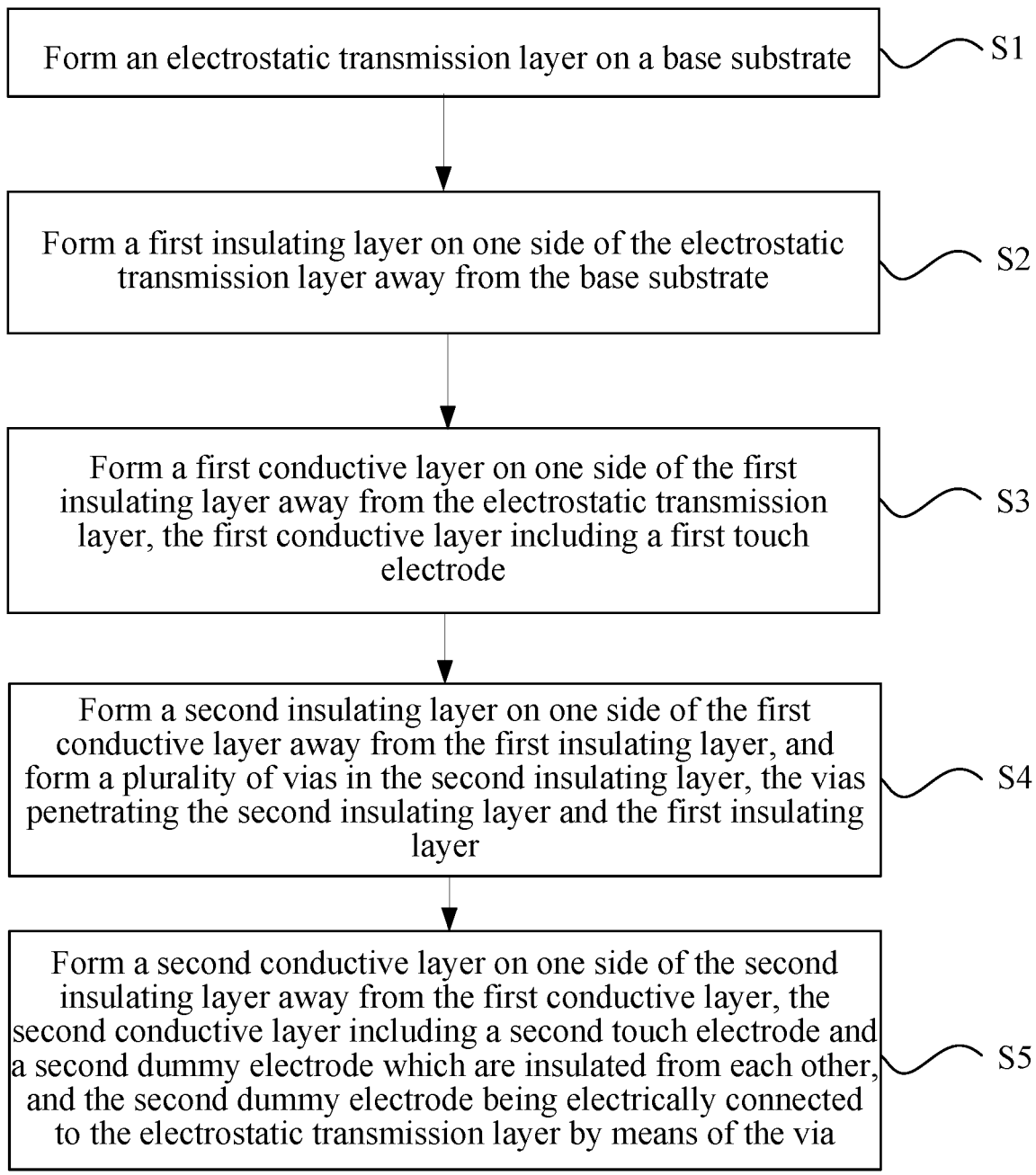
FIG. 14 is a schematic flowchart of a preparation method for a touch substrate according to an embodiment of the present disclosure.

In some exemplary embodiments, referring to FIG. 12 and FIG. 13, each second dummy sub-electrode may include a second dummy main electrode 710 and a plurality of second dummy floating electrodes 711 which are disconnected from one another. The plurality of second dummy floating electrodes 711 are disposed between the second dummy main electrode 710 and the second touch electrode 70, and the second dummy main electrode 710, the second dummy floating electrode 711, and the second touch electrode 70 are insulated from one another.

In some exemplary embodiments, referring to FIG. 13, one or two columns of the second dummy floating electrodes 711 sequentially arranged along the first direction may be disposed between two adjacent second touch electrodes 70.

In some exemplary embodiments, a manufacturing material of the electrostatic transmission layer 30 may be a high resistance indium tin oxide membrane added with conductive particles. Exemplarily, a resistance value range corresponding to the high resistance may be $10^7$ to $10^{13}$ Ω (ohm), and a manufacturing material of the conductive particles may include: gold, silver, aluminum, and the like.

In some exemplary embodiments, a material of the first insulating layer 40 and the second insulating layer 60 may be either any one or a combination of silicon oxynitride (SiNxOy) or silicon dioxide (SiO2).

The technical solution of the embodiments of the present disclosure is further described below by means of a process for preparing a touch substrate according to an embodiment of the present disclosure. The "patterning process" described in the embodiments includes processing such as depositing of a film layer, coating with a photoresist, mask exposure, development, etching, and stripping of the photoresist. The "lithography process" described in the embodiments of the present disclosure includes processing such as coating of a film layer, mask exposure, and development, and is a mature preparation process in the related art. The deposition may adopt a known process such as sputtering or chemical vapor deposition, the coating may adopt a known coating process, and the etching may adopt a known approach, which are not specifically limited here.

A first parent plate 10 and a second parent plate 20 are formed separately.

In some exemplary embodiments, a gate electrode, a gate electrode data line, a gate insulating layer, an active layer, a source and drain electrode layer, a pixel electrode layer, and a data line are deposited on a substrate to form the first parent plate 10; and a color pixel layer, a protective layer, a common electrode layer, and a spacer are deposited on another substrate to form the second parent plate 20.

An electrostatic transmission layer 30 is formed on the second parent plate 20.

In some exemplary embodiments, an indium tin oxide (ITO) membrane may be deposited on the second parent plate by means of an approach such as coating, magnetron sputtering, thermal evaporation, or plasma enhanced chemical vapor deposition (PECVD), to obtain the electrostatic transmission layer 30.

In some exemplary embodiments, a manufacturing material of the electrostatic transmission layer 30 is a high resistance ITO membrane added with conductive particles. Exemplarily, a resistance value range corresponding to the high resistance may be $10^7$ to $10^{13}$ Ω, and a manufacturing material of the conductive particles may include: gold, silver, aluminum, and the like.

In some exemplary embodiments, the electrostatic transmission layer may be used as a first polarizer layer.

Figure 5:
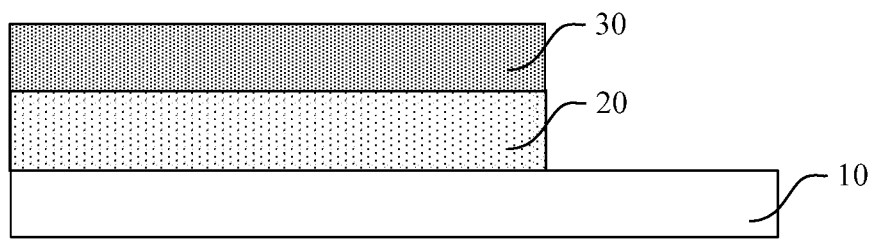
FIG. 5 is a schematic diagram of a structure of a touch substrate in which cell alignment of a first parent plate and a second parent plate is performed.

Referring to FIG. 5, cell alignment is performed on the first parent plate 10 and the second parent plate 20, and liquid crystal is filled between the first parent plate 10 and the second parent plate 20.

In this embodiment, the electrostatic transmission layer 30 is located on one side of the second parent plate 20 away from the first parent plate 10.

In some exemplary embodiments, act (3) may also be performed before act (2), that is, cell alignment is first performed on the first parent plate 10 and the second parent plate 20 and liquid crystal is filled between the first parent plate 10 and the second parent plate 20, and then the electrostatic transmission layer 30 is formed on one side of the second parent plate 20 away from the first parent plate 10.

Figure 6:
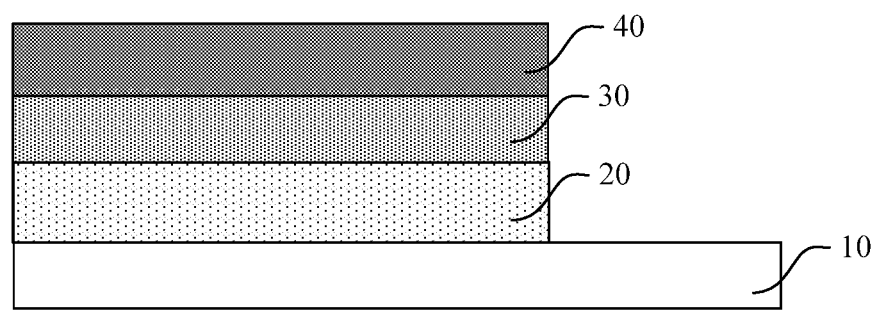
FIG. 6 is a schematic diagram of a structure of a touch substrate in which a first insulating layer is formed.

A first insulating layer 40 is formed on one side of the electrostatic transmission layer 30 away from the first parent plate 10, referring to FIG. 6.

In this embodiment, the first insulating layer 40 may be formed by means of evaporation. The first insulating layer 40 may be made of a transparent material, so that the touch substrate can be used in an integrated touch display panel.

A pattern of a first conductive layer 50 is formed on one side of the first insulating layer 40 away from the electrostatic transmission layer 30. The formation of the pattern of the first conductive layer 50 may include: depositing a first conductive membrane on the first insulating layer 40, performing coating with a photoresist, exposing the photoresist, performing development, and finally etching the first conductive membrane to form the pattern of the first conductive layer 50, referring to FIG. 7 and FIG. 8.

In some exemplary embodiments, the first conductive membrane may be made of a metal material, or may be made of a transparent conductive material, such as indium tin oxide (ITO), indium zinc oxide (IZO), carbon nanotubes, or graphene.

Figure 7:
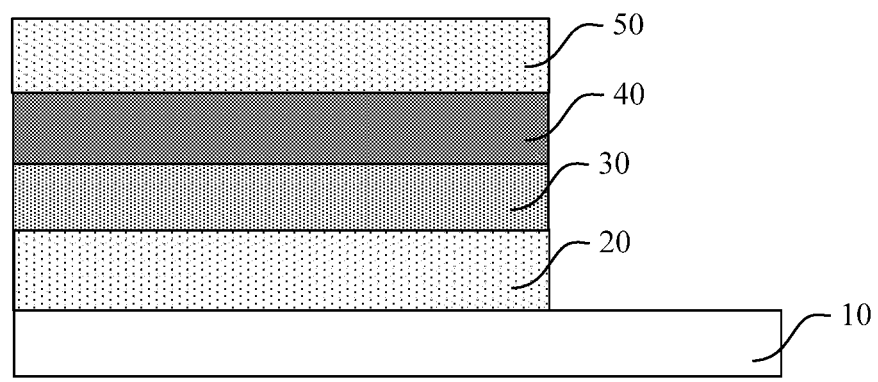
FIG. 7 is a schematic diagram of a structure of a touch substrate in which a first conductive layer is formed.

Referring to FIG. 7, the first conductive layer 50 may include: a first touch electrode 51, and the first touch electrode 51 may include a plurality of first sub-electrodes sequentially arranged at intervals along a first direction.

In some exemplary embodiments, the first sub-electrode may be a mesh structure.

Referring to FIG. 8, in some exemplary embodiments, the first conductive layer 50 may further include a plurality of first dummy electrodes 52 insulated from one another, and the first dummy electrode 52 and the first touch electrode 51 are insulated from each other.

Referring to FIG. 9, in some exemplary embodiments, the first dummy electrode 52 may include a first dummy main electrode 520 and a first dummy floating electrode 521, the first dummy floating electrode 521 is disposed between the first dummy main electrode 520 and the first touch electrode 51, and the first dummy main electrode 520, the first dummy floating electrode 521, and the first touch electrode 51 are insulated from one another.

A pattern of a second insulating layer 60 is formed on one side of the first conductive layer 50 away from the first insulating layer 40.

Figure 10:
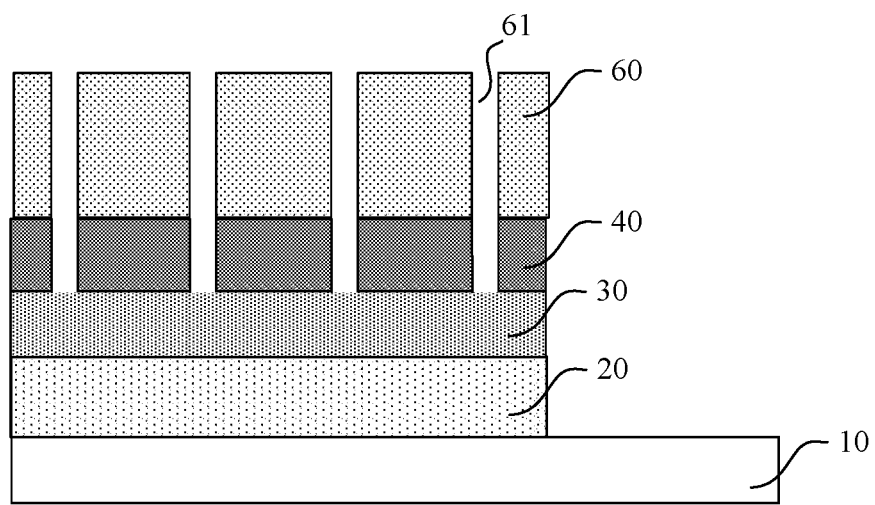
FIG. 10 is a schematic diagram of a structure of a touch substrate in which a second insulating layer is formed.

In this embodiment, the pattern of the second insulating layer 60 may be formed by means of evaporation. Referring to FIG. 10, the second insulating layer 60 located above the first conductive layer 50 and the first insulating layer 40 is provided with at least one via 61, and the via 61 penetrates the first insulating layer 40 and the second insulating layer 60 and exposes the electrostatic transmission layer 30. The second insulating layer 60 may be made of a transparent material, so that the touch substrate can be used in the integrated touch display panel.

In some exemplary embodiments, the material of the first insulating layer 40 and the second insulating layer 60 may be either any one or a combination of silicon oxynitride (SiNxOy) or silicon dioxide (SiO2).

A pattern of a second conductive layer is formed above the second insulating layer 60. The formation of the pattern of the second conductive layer may include: depositing a second conductive membrane on the second insulating layer 60, performing coating with a photoresist, exposing the photoresist, performing development, and finally etching the second conductive membrane to form the pattern of the second conductive layer.

In some exemplary embodiments, the second conductive membrane may be made of a metal material, or may be made of a transparent conductive material, such as indium tin oxide (ITO), indium zinc oxide (IZO), carbon nanotubes, or graphene.

Figure 11:
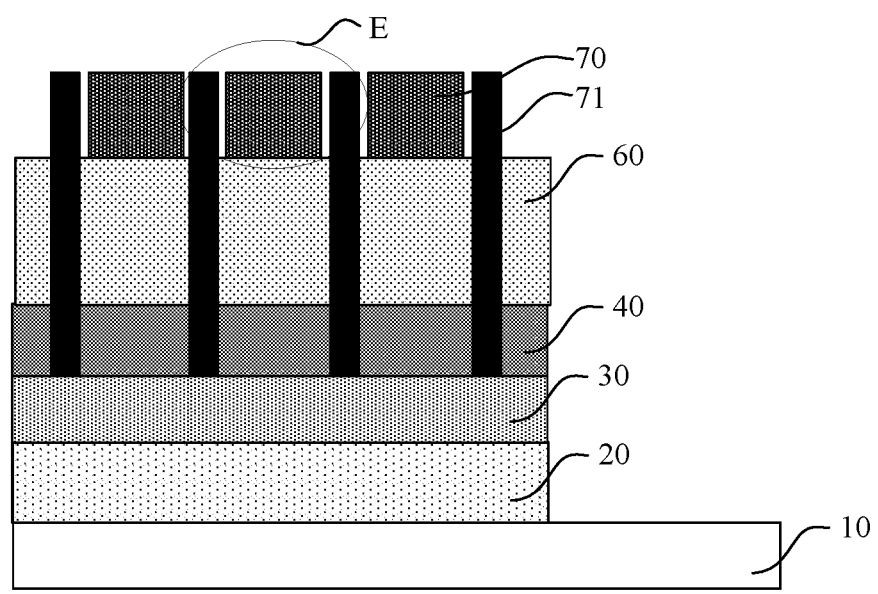
FIG. 11 is a schematic diagram of a structure of a touch substrate in which a second conductive layer is formed.

In some exemplary embodiments, referring to FIG. 1, FIG. 11, and FIG. 12, the second conductive layer may include: a second touch electrode 70 and a second dummy electrode 71 which are insulated from each other, wherein the second touch electrode 70 may include a plurality of second touch sub-electrodes, the second dummy electrode 71 may include a plurality of second dummy sub-electrodes, and at least one second touch sub-electrode and at least one second dummy sub-electrode are sequentially arranged in parallel at intervals along a second direction and are electrically isolated from each other.

In some exemplary embodiments, the first direction intersects the second direction. Exemplarily, the first direction and the second direction may be perpendicular to each other.

In some exemplary embodiments, one second dummy sub-electrode is disposed between every two adjacent second touch sub-electrodes, and one second touch sub-electrode is disposed between every two adjacent second dummy sub-electrodes.

In some exemplary embodiments, the second dummy sub-electrode is connected to the electrostatic transmission layer 30 by means of the via 61 in the second insulating layer 60 and the first insulating layer 40.

For touch substrates of some technologies, a plurality of first kerfs are designed in a mesh structure of the dummy electrode, and the dummy electrode is cut into a plurality of disconnected rhombuses by means of the plurality of first kerfs. In such a design, during film tearing from the surface of the touch substrate, static electricity is generated and stored in the dummy electrode and cannot be discharged, thereby affecting the rotation of liquid crystal molecules in the display panel and eventually causing the defect of abnormal display. For touch substrates of some other technologies, a plurality of second kerfs are designed in the mesh structure of the dummy electrode, and a complete rhombus of the dummy electrode is cut into multiple crosses by means of the plurality of second kerfs, so as to reduce the possibility that the dummy electrode stores charges. However, there are two problems bought by the design in this case. First, a problem in shadow elimination is caused, that is, the outline of a dummy electrode pattern can be clearly seen from the outside in the normal environment where a backlight module is not lit or under strong light. Secondly, after the rhombus is cut, the dummy electrode is still in a floating state, and the electrostatic charges on the dummy electrode still cannot be discharged. Since the electrostatic charges are accumulated to a certain degree and still cannot be discharged, the problem of electrostatic abnormal display can be alleviated but cannot be solved.

In this embodiment of the present disclosure, the plurality of complete second dummy sub-electrodes are provided and connected to the electrostatic transmission layer 30, so that the storage of the induced electrostatic charges in the dummy electrode is effectively reduced, facilitating the discharge of the electrostatic charges, and thereby solving the problem of abnormal display of a liquid crystal display panel caused by the static electricity and the problem in shadow elimination caused by the cut dummy electrode. In addition, the touch substrate in this embodiment of the present disclosure has a low mutual capacitance value and a low RC delay, and is compatible with various active pens. Since the static electricity on the dummy electrode is discharged in time, a signal of the active pen is not be absorbed by the dummy electrode, and the performance of the active pen is not affected.

In some exemplary embodiments, each of the second dummy sub-electrode and the second touch sub-electrode may be a mesh structure, meshes in each second dummy sub-electrode and each second touch sub-electrode are separately kept intact without cutting, and the width of the second touch sub-electrode in the second direction is greater than the width of the second dummy sub-electrode in the second direction.

Referring to FIG. 13, in some exemplary embodiments, each second dummy sub-electrode may include a second dummy main electrode 710 and a plurality of second dummy floating electrodes 711 which are disconnected from one another. The plurality of second dummy floating electrodes 711 are disposed between the second dummy main electrode 710 and the second touch electrode 70, and the second dummy main electrode 710, the second dummy floating electrode 711, and the second touch electrode 70 are insulated from one another.

In this embodiment, the plurality of second dummy floating electrodes 711 disconnected from one another are disposed between the second dummy main electrode 710 and the second touch electrode 70, so as to avoid a connection between the second dummy electrode 71 and the second touch electrode 70 caused during electrostatic breakdown.

Referring to FIG. 13, in some exemplary embodiments, one or two columns of second dummy floating electrodes 711 sequentially arranged along the first direction are disposed between two adjacent second touch electrodes 70.

In an actual process, if the number of columns of the configured second dummy floating electrodes 711 is excessively small (that is, the number of the kerfs is excessively small, wherein the kerf in the present disclosure refers to a disconnection position between two adjacent electrodes insulated from each other), an etchant is easy to accumulate in a rhombus block shown in FIG. 12 and cannot be discharged, thereby causing the problem of over-etching. On the contrary, if the number of columns of the configured second dummy floating electrodes 711 is excessively large (that is, the number of the kerfs is excessively large), the problem in shadow elimination may occur. Therefore, in this embodiment of the present disclosure, one or two columns of the second dummy floating electrodes 711 sequentially arranged along the first direction are disposed between two adjacent second touch electrodes 70, so as to avoid the problem of over-etching and the problem in shadow elimination.

The first parent plate and the second parent plate on which cell alignment processing has been performed are cut into a liquid crystal display panel, and a flexible circuit board is bonded to a bonding area.

In this embodiment, a portion of an array substrate exceeds an edge of a cell alignment substrate, the bonding area is disposed in an area exceeding the cell alignment substrate, and the flexible circuit board providing a drive signal is electrically connected to a signal line of the bonding area.

In some exemplary embodiments, the bonding area includes a ground wire. After the flexible circuit board is bonded to the bonding area, the electrostatic transmission layer 30 is connected to the ground wire of the bonding area. By connecting the electrostatic transmission layer 30 to the ground wire of the bonding area, the static electricity in the second dummy electrode 71 can be directly discharged to the ground, thereby solving the problem of electrostatic abnormal display.

In some exemplary embodiments, the electrostatic transmission layer 30 may also be used as an electromagnetic shielding layer. In this case, the electrostatic transmission layer 30 can shield a display signal and a touch signal from each other, and enhance antinoise capability of the entire touch display substrate.

A polarizer (POL) 80 is attached to the outer side of the liquid crystal display panel to assemble a backlight module.

In this embodiment, a manufacturing material of the polarizer 80 is a high resistance POL film layer.

In this embodiment of the present disclosure, the high resistance refers to a relatively large resistance value. Exemplarily, a resistance value range corresponding to the high resistance may be $10^7$ to $10^{13}$ Ω (ohm). Low resistance refers to a relatively small resistance value, and exemplarily, a resistance value range corresponding to the low resistance may be $10^3$ to $10^7$ ohms.

In touch substrates of some technologies, a low resistance POL film layer is used to prepare the polarizer 80. The low resistance POL film layer is easy to discharge the static electricity, but has high costs and few suppliers. In this embodiment of the present disclosure, a high resistance ITO membrane and a high resistance POL film layer are used to replace the low resistance POL film layer. The high resistance POL film layer has low costs and small load on the touch signal, thereby improving touch sensitivity and reducing IC debugging difficulty. In the touch substrate of this embodiment of the present disclosure, conductive particles are added to the high resistance ITO membrane to discharge the static electricity, and the high resistance POL film layer may be used to manufacture the polarizer 80, so that on one hand, the problem of relatively large load caused by the use of the low resistance POL film layer is solved, and on the other hand, the problem of high costs and few suppliers of the low resistance POL film is solved.

It can be seen from the above preparation process that, in the touch substrate provided by this embodiment of the present disclosure, the storage of the induced electrostatic charge in the dummy electrode is effectively reduced by connecting the second dummy electrode 71 to the electrostatic transmission layer 30, facilitating the discharge of the electrostatic charge, and thereby solving the problem of abnormal display of the liquid crystal display panel caused by the static electricity and the problem in shadow elimination caused by the cut dummy electrode.

The structure of the touch substrate of the present disclosure and the preparation process thereof are only exemplary illustrations. In an exemplary embodiment, the corresponding structure can be changed and the patterning processes can be increased or decreased according to actual needs. For example, no display substrate may be provided, and the touch substrate may be directly disposed on the base substrate, which is not limited The present disclosure is not limited thereto.

An embodiment of the present disclosure further provides a touch apparatus including the above touch substrate.

It should be noted that the type of the touch apparatus is not limited in the embodiments of the present disclosure. The touch apparatus may be a liquid crystal display apparatus, an organic light emitting diode (OLED) display apparatus, or other types of display apparatuses, or may be a pure touch apparatus.

When the touch apparatus is a liquid crystal display apparatus, the liquid crystal display apparatus includes an array substrate and a cell alignment substrate, the array substrate includes a thin film transistor and a pixel electrode, a color filter layer may be disposed on the array substrate or on the cell alignment substrate, and in this case, the touch substrate may be an array substrate or a cell alignment substrate. When the touch apparatus is an OLED display apparatus, the OLED display apparatus includes an array substrate and a packaging substrate, the array substrate may include a thin film transistor, an anode electrically connected to a drain electrode of the thin film transistor, a cathode, and an organic material functional layer, and in this case, the touch substrate may be an array substrate or an encapsulation substrate.

In the touch apparatus provided by this embodiment of the present disclosure, the storage of electrostatic charges in the dummy electrode is effectively reduced by connecting the second dummy electrode to the electrostatic transmission layer, facilitating the discharge of the electrostatic charges.

An embodiment of the present disclosure provides a preparation method for a touch substrate. Referring to FIG. 8, the preparation method for a touch substrate according to this embodiment of the present disclosure includes the following acts.

In act S1, an electrostatic transmission layer is formed on a base substrate.

In act S2, a first insulating layer is formed on one side of the electrostatic transmission layer away from the base substrate.

In act S3, a first conductive layer is formed on one side of the first insulating layer away from the electrostatic transmission layer, wherein the first conductive layer includes a first touch electrode;

In act S4, a second insulating layer is formed on one side of the first conductive layer away from the first insulating layer, and a plurality of vias are formed in the second insulating layer, wherein the vias penetrate the second insulating layer and the first insulating layer.

In act S5, a second conductive layer is formed on one side of the second insulating layer away from the first conductive layer, wherein the second conductive layer includes a second touch electrode and a second dummy electrode which are insulated from each other, and the second dummy electrode is electrically connected to the electrostatic transmission layer by means of the via.

In some exemplary embodiments, the first touch electrode includes a plurality of first sub-electrodes sequentially arranged at intervals along a first direction.

The second touch electrode includes a plurality of second touch sub-electrodes, the second dummy electrode includes a plurality of second dummy sub-electrodes, and at least one of the second touch sub-electrodes and at least one of the second dummy sub-electrodes are sequentially arranged in parallel at intervals along a second direction and are electrically isolated from each other.

In some exemplary embodiments, each of the first sub-electrode, the second dummy sub-electrode, and the second touch sub-electrode is a mesh structure, and a width of the second touch sub-electrode in the second direction is greater than a width of the second dummy sub-electrode in the second direction.

In some exemplary embodiments, each of the second dummy sub-electrodes includes a second dummy main electrode and a plurality of second dummy floating electrodes which are disconnected from one another, the plurality of second dummy floating electrodes are disposed between the second dummy main electrode and the second touch electrode, and the second dummy main electrode, the second dummy floating electrode, and the second touch electrode are insulated from one another.

In some exemplary embodiments, one or two columns of the second dummy floating electrodes sequentially arranged along the first direction are disposed between two adjacent second touch electrodes.

According to the preparation method for the touch substrate provided by this embodiment of the present disclosure, the storage of electrostatic charges in the dummy electrode is effectively reduced by connecting the second dummy electrode to the electrostatic transmission layer, facilitating the discharge of the electrostatic charges, and thereby solving the problem of abnormal display of a liquid crystal display panel caused by the static electricity and the problem in shadow elimination caused by the cut dummy electrode.

What needs to be noted is as follows.

The accompanying drawings of the embodiments of the present disclosure only involve the structures involved in the embodiments of the present disclosure, and for other structures, reference may be made to usual designs.

In the case of no conflict, the embodiments of the present disclosure, i.e., the features in the embodiments, may be combined with each other to obtain a new embodiment.

Although the embodiments disclosed in the present disclosure are as described above, the content described is only the embodiments used to facilitate the understanding of the present disclosure, and is not intended to limit the present disclosure. Anyone skilled in the art to which the present disclosure belongs can make any modifications and changes in the implementation forms and details without departing from the spirit and scope disclosed in the present disclosure. However, the scope of patent protection of the present disclosure is still subject to the scope defined by the appended claims.

What is claimed is:

1. A touch substrate, comprising an electrostatic transmission layer, a first insulating layer, a first conductive layer, a second insulating layer, and a second conductive layer which are sequentially stacked, wherein:

the first conductive layer comprises a first touch electrode, the second conductive layer comprises a second touch electrode and a second dummy electrode which are insulated from each other, and the second dummy electrode is electrically connected to the electrostatic transmission layer by means of a via penetrating the first insulating layer and the second insulating layer; and the first conductive layer further comprises a plurality of first dummy electrodes insulated from one another, and the first dummy electrode and the first touch electrode are insulated from each other.

2. The touch substrate according to claim 1, wherein the first touch electrode comprises a plurality of first sub-electrodes sequentially arranged at intervals along a first direction; and the second touch electrode comprises a plurality of second touch sub-electrodes, the second dummy electrode comprises a plurality of second dummy sub-electrodes, and at least one of the second touch sub-electrodes and at least one of the second dummy sub-electrodes are sequentially arranged in parallel at intervals along a second direction and are electrically isolated from each other.

3. The touch substrate according to claim 2, wherein each of the first sub-electrode, the second dummy sub-electrode, and the second touch sub-electrode is a mesh structure, and a width of the second touch sub-electrode in the second direction is greater than a width of the second dummy sub-electrode in the second direction.

4. The touch substrate according to claim 2, wherein each of the second dummy sub-electrodes comprises a second dummy main electrode and a plurality of second dummy floating electrodes which are disconnected from one another, the plurality of second dummy floating electrodes are disposed between the second dummy main electrode and the second touch electrode, and the second dummy main electrode, the second dummy floating electrode, and the second touch electrode are insulated from one another.

5. The touch substrate according to claim 4, wherein one or two columns of the second dummy floating electrodes sequentially arranged along the first direction are disposed between two adjacent second touch electrodes.

6. The touch substrate according to claim 1, wherein a manufacturing material of the electrostatic transmission layer is an indium tin oxide membrane added with conductive particles, a resistance value of the indium tin oxide membrane is $10^7$ to $10^{13}$ ohms, and a manufacturing material of the conductive particles comprises any one or more of gold, silver, and aluminum.

7. The touch substrate according to claim 1, further comprising a base substrate, wherein the base substrate comprises an array substrate and an opposite substrate which are disposed in a cell alignment manner, the base substrate comprises a bonding area, the bonding area comprises a ground wire, and the electrostatic transmission layer is connected to the ground wire of the bonding area.

8. A touch apparatus, comprising a base substrate and a touch substrate disposed on the base substrate, wherein the base substrate comprises an array substrate and an opposite substrate which are disposed in a cell alignment manner, and the touch substrate is the touch substrate according to claim 1.

9. A preparation method for a touch substrate, comprising:
forming an electrostatic transmission layer on a base substrate;
forming a first insulating layer on one side of the electrostatic transmission layer away from the base substrate;
forming a first conductive layer on one side of the first insulating layer away from the electrostatic transmission layer, wherein the first conductive layer comprises a first touch electrode;
forming a second insulating layer on one side of the first conductive layer away from the first insulating layer, and forming a plurality of vias in the second insulating layer, wherein the vias penetrate the second insulating layer and the first insulating layer; and
forming a second conductive layer on one side of the second insulating layer away from the first conductive layer, wherein the second conductive layer comprises a second touch electrode and a second dummy electrode which are insulated from each other, and the second dummy electrode is electrically connected to the electrostatic transmission layer by means of the via.

10. The preparation method according to claim 9, wherein the first touch electrode comprises a plurality of first sub-electrodes sequentially arranged at intervals along a first direction; and the second touch electrode comprises a plurality of second touch sub-electrodes, the second dummy electrode comprises a plurality of second dummy sub-electrodes, and at least one of the second touch sub-electrodes and at least one of the second dummy sub-electrodes are sequentially arranged in parallel at intervals along a second direction and are electrically isolated from each other.

11. The preparation method according to claim 10, wherein each of the first sub-electrode, the second dummy sub-electrode, and the second touch sub-electrode is a mesh structure, and a width of the second touch sub-electrode in the second direction is greater than a width of the second dummy sub-electrode in the second direction.

12. The preparation method according to claim 10, wherein each of the second dummy sub-electrodes comprises a second dummy main electrode and a plurality of second dummy floating electrodes which are disconnected from one another, the plurality of second dummy floating electrodes are disposed between the second dummy main electrode and the second touch electrode, and the second dummy main electrode, the second dummy floating electrode, and the second touch electrode are insulated from one another.

13. The preparation method according to claim 12, wherein one or two columns of the second dummy floating electrodes sequentially arranged along the first direction are disposed between two adjacent second touch electrodes.

* * * * *